(12) United States Patent
Lee (10) Patent No.: US 11,877,687 B2
(45) Date of Patent: Jan. 23, 2024

(54) HEATER AND COOKWARE FOR FLAMELESS CATALYTIC COMBUSTION

(71) Applicant: CCDC Army Research Laboratory, Adelphi, MD (US)

(72) Inventor: Ivan Chihang Lee, Excelsior, MN (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 340 days.

(21) Appl. No.: 16/576,547

(22) Filed: Sep. 19, 2019

(65) Prior Publication Data

US 2020/0022524 A1 Jan. 23, 2020

Related U.S. Application Data

(63) Continuation-in-part of application No. 14/809,306, filed on Jul. 27, 2015, now Pat. No. 10,584,869.

(51) Int. Cl.
| | |
|---|---|
| A47J 27/00 | (2006.01) |
| F23D 14/28 | (2006.01) |
| F23D 14/18 | (2006.01) |
| A47J 36/02 | (2006.01) |

(52) U.S. Cl.
CPC ............. *A47J 27/002* (2013.01); *A47J 36/02* (2013.01); *F23D 14/18* (2013.01); *F23D 14/28* (2013.01)

(58) Field of Classification Search
CPC ......... F01N 2510/0684; F01N 2570/14; F01N 2590/06; F01N 3/10; F01N 2510/06; F01N 13/009; F01N 13/0093; F01N 3/101; F01N 3/2828; F01N 3/035; F01N 13/16; F01N 3/103; F01N 3/2807; F01N 3/2825; F01N 11/007; F01N 2330/04; F01N 2330/06; F01N 2370/02; F01N 2510/067; F01N 2510/0682; F01N 3/0814; F01N 3/0864; F01N 3/20; F01N 3/281; F01N 3/2814; F01N 3/2853
See application file for complete search history.

(56) References Cited

U.S. PATENT DOCUMENTS

| | | | |
|---|---|---|---|
| 1,394,894 A | * | 10/1921 | Good ...................... F23D 11/10 |
| | | | 431/208 |
| 3,411,994 A | | 11/1968 | Wainer |
| 3,857,668 A | | 12/1974 | Koch |
| 4,252,620 A | | 2/1981 | Tomita |
| 4,452,877 A | | 6/1984 | Dhillon |
| 4,577,611 A | | 3/1986 | Hagino |
| 4,825,846 A | | 5/1989 | Farioli |

(Continued)

OTHER PUBLICATIONS

Louise Samain, Aleksander Jaworski, Mattias Edén, Danielle M. Ladd, Dong-Kyun Seo, F. Javier Garcia-Garcia, Ulrich Häussermann, Structural analysis of highly porous γ-Al2O3, Journal of Solid State Chemistry, (Year: 2014).*

(Continued)

*Primary Examiner* — Jason Lau
(74) *Attorney, Agent, or Firm* — Eric B. Compton (57) ABSTRACT

A heater or article of cookware is formed of a metal sheet with a first and second surface. A metal oxide layer is formed on the first surface of the sheet and a combustion catalyst is impregnated into the metal oxide layer. Fuel and air is then supplied to the first side of the metal sheet resulting in flameless catalytic combustion which heats the metal sheet.

17 Claims, 6 Drawing Sheets

(56) References Cited

U.S. PATENT DOCUMENTS

| | | | | |
|---|---|---|---|---|
| 4,870,046 A | * | 9/1989 | Yamanaka | B01D 53/945 |
| | | | | 502/439 |
| 4,894,127 A | | 1/1990 | Wong et al. | |
| 5,037,293 A | | 8/1991 | Kirby | |
| 5,251,609 A | | 10/1993 | Thibault et al. | |
| 5,352,494 A | * | 10/1994 | Rousseau | C04B 41/009 |
| | | | | 427/562 |
| 5,993,192 A | * | 11/1999 | Schmidt | F23D 14/18 |
| | | | | 431/12 |
| 5,996,243 A | * | 12/1999 | Chang | A45D 20/06 |
| | | | | 34/97 |
| 7,066,132 B1 | * | 6/2006 | Verbrugge | F02B 77/04 |
| | | | | 123/193.6 |
| 7,241,136 B2 | | 7/2007 | Lehoux et al. | |
| 8,585,396 B2 | | 11/2013 | Hockaday et al. | |
| 8,691,403 B2 | | 4/2014 | Amakusa et al. | |
| 2002/0070124 A1 | * | 6/2002 | Andrews | F02B 43/10 |
| | | | | 205/628 |
| 2003/0129557 A1 | * | 7/2003 | Chapman | F23D 14/18 |
| | | | | 431/268 |
| 2004/0156737 A1 | * | 8/2004 | Rakowski | C22C 38/58 |
| | | | | 420/53 |
| 2005/0250065 A1 | * | 11/2005 | Carbone | F23D 14/06 |
| | | | | 431/354 |
| 2007/0054132 A1 | * | 3/2007 | LaBarge | B32B 18/00 |
| | | | | 428/432 |
| 2007/0105060 A1 | | 5/2007 | Cai et al. | |
| 2010/0020456 A1 | * | 1/2010 | Chen | G06F 1/1616 |
| | | | | 361/56 |
| 2011/0165300 A1 | | 7/2011 | Roychoudhury et al. | |
| 2011/0305881 A1 | | 12/2011 | Schultz et al. | |
| 2012/0301743 A1 | | 11/2012 | Walker et al. | |

OTHER PUBLICATIONS

Catalytic Coating & Materials, http://www.dieselnet.com/tech/cat_mat.php (Year: 2005).*

Debasis Maharana and P. A. Soloman, "Flameless catalytic LPG combustion and its optimization approach," Procedia Technology 24 (2016) 689-695.

Joyce P. Brayboy, "Students showed off at ARL's 8th annual Symposium" ARL Public Affairs Office, dated Aug. 12, 2014, available online at: https://www.arl.army.mil/www/default.cfm?article=2516.

"Cooking With Materials Science," New Story, A. James Clark School of Engineering, University of Maryland, dated Nov. 20, 2014, available online at: https://mse.umd.edu/news/story/cooking-with-materials science.

* cited by examiner

HEATER AND COOKWARE FOR FLAMELESS CATALYTIC COMBUSTION

RELATED APPLICATION DATA

This application is a continuation-in-part (CIP) of U.S. patent application Ser. No. 14/809,306 filed Jul. 27, 2015, the disclosure of which is herein incorporated by reference in its entirety for all purposes.

GOVERNMENT INTEREST

The invention described herein may be manufactured, used, and licensed by or for the United States Government.

BACKGROUND

I. Field of Use

The present invention relates generally to heaters and, more particularly, to using flameless catalytic combustion for heating and cooking.

II. Description of Related Art

Mobile cooking stoves are necessarily required by the military for use in field operations. The current cooking stove used by the military is the Modern Burner Unit which utilizes conventional combustion to heat the stovetop surface.

The Modern Burner Unit, however, suffers from a number of disadvantages. First, the Modern Burner Unit is loud and releases carbon monoxide in operation. As such, the stove must be properly ventilated in order to ensure the safety of those in proximity to the stove.

The Modern Burner Unit is also inefficient in operation. This inefficiency results from the use of conventional combustion to heat the stovetop surface.

SUMMARY

The present invention provides a heater which may be used as a cooking stove or cookware which overcomes the above mentioned disadvantages of the previously known devices.

According to embodiments, the heater may be formed of a metal piece having a first and second surfaces; a porous metal oxide layer formed on the first surface of the metal piece; and a combustion catalyst impregnated within the porous metal oxide layer. A fuel interacts with the catalyst in the porous metal oxide layer and undergoes flameless catalytic combustion which generates heat. The heater may be configured as an article of cookware in some embodiments. More, the fuel connection may connect to any suitable source of fuel which can support flameless catalytic combustion, such as, for example, a source of JP-8 jet fuel, gasoline, kerosene or propane.

When fuel interacts with the catalyst in the porous metal oxide layer it undergoes flameless catalytic combustion which generates heat. The heat generated at the first surface is conductively transferred through the metal piece to the second surface thus raising the temperature of the second surface. Such heating by the flameless catalytic combustion is harnessed to raise the temperature of the second surface to a temperature suitable for cooking food and/or boiling water.

The porous metal oxide layer may be formed on the bottom and/or external sidewalls of said first surface of said metal piece. For instance, the second surface of said metal piece faces the interior of the article. Various cookware articles are envision, such as, for example, a pot, a kettle, a cauldron, a wok, a griddle, a frying pan, a baking pan, a sauté pan, a grill pan, a roasting pan, a sauce pan, a tea/coffee pot, a fondue pot, a skillet, a cookie sheet, a waffle pan, an omelet pan, a braising pan, a Dutch oven, a tabletop grill, a grill basket, a grill mat, a grill liner, a smoker box or an outdoor cookware.

In embodiments, the metal piece may be a metal sheet and may, for example, be constructed of aluminum or titanium or any alloys thereof.

A thick metal oxide layer is formed on the first surface of the sheet. This thick metal oxide may be formed by anodization or cathodization to form a thick porous layer of the metal oxide, or alumina where the metal sheet is made of aluminum. In such cases, the porous metal oxide layer will be comprised an oxide of the same metal forming the metal sheet.

A combustion catalyst is impregnated within the metal oxide layer. The combustion catalyst preferably comprises platinum, rhodium, or an oxide thereof, although other types of combustion catalysts may be alternatively used.

A source of fuel as well as air is then supplied to the first surface of the metal sheet. The fuel, preferably JP-8 jet fuel, interacts with the catalyst in the metal oxide layer and undergoes catalytic combustion. Such catalytic combustion is highly efficient and reduces, or altogether eliminates, noxious oxide emissions such as carbon monoxide. In practice, the catalytic combustion generates sufficient heat so that the metal sheet can serve as a cooking stove. It is noted that jet fuel contains lots of sulfur, and we expect liquefied petroleum gas fuel or propane gas fuel which contains fewer sulfur would also work. This will also open applications not just in the kitchen but also outdoor stoves, like for BBQs or camping.

To support the cookware article during flameless catalytic combustion heating a fuel combustion chamber may be provided in embodiments. The chamber may include a surface which engages said cookware article and surrounds the porous metal oxide layer impregnated with the flameless catalytic combustion catalyst, a connection to a source of fuel, and an opening for providing a flow of fuel and air to the surrounded porous metal oxide layer. The flow of fuel may be (i) substantially parallel to the surrounded porous metal oxide layer, or (ii) substantially perpendicular to the surrounded porous metal oxide layer. The opening may further include a porous foam where air intermixes with the fuel. And each opening may also include a lip to support at least an outer periphery of the bottom of the cookware article. The lip may be recessed with respect to the surface. In some embodiments, the fuel combustion chamber may further include a heating element which preheats the air and vaporizes said fuel entering the opening.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE INVENTION

Embodiments of the present invention utilize flameless catalytic combustion to generate heat for cooking purposes. Unlike conventional burning, catalytic combustion does not use a flame to burn the fuel. It incorporates catalysts to convert the fuel into the products of combustion and provide flameless heat.

Figure 1:
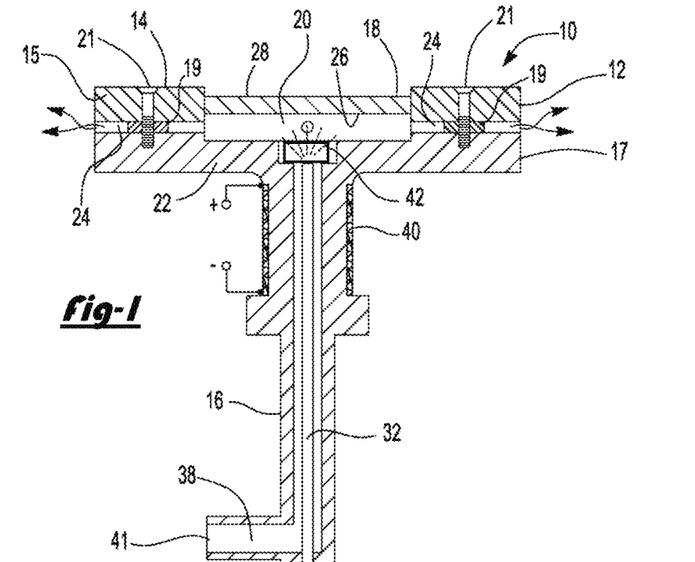
FIG. 1 is a longitudinal sectional view illustrating a heater embodiment in accordance with the present invention.

With reference first to FIG. 1, a heater 10 in accordance with an embodiment of the present invention is illustrated. The heater 10 includes a housing 12 having an upper and generally circular housing top 14 supported by an elongated and vertically extending leg 16. The housing 12 may be either of a one-piece or multi-piece construction and may be constructed of any suitable rigid material provided, however, that the housing top 14 be able to withstand relatively high temperatures of the type used in cooking food.

Figures 2, 3:
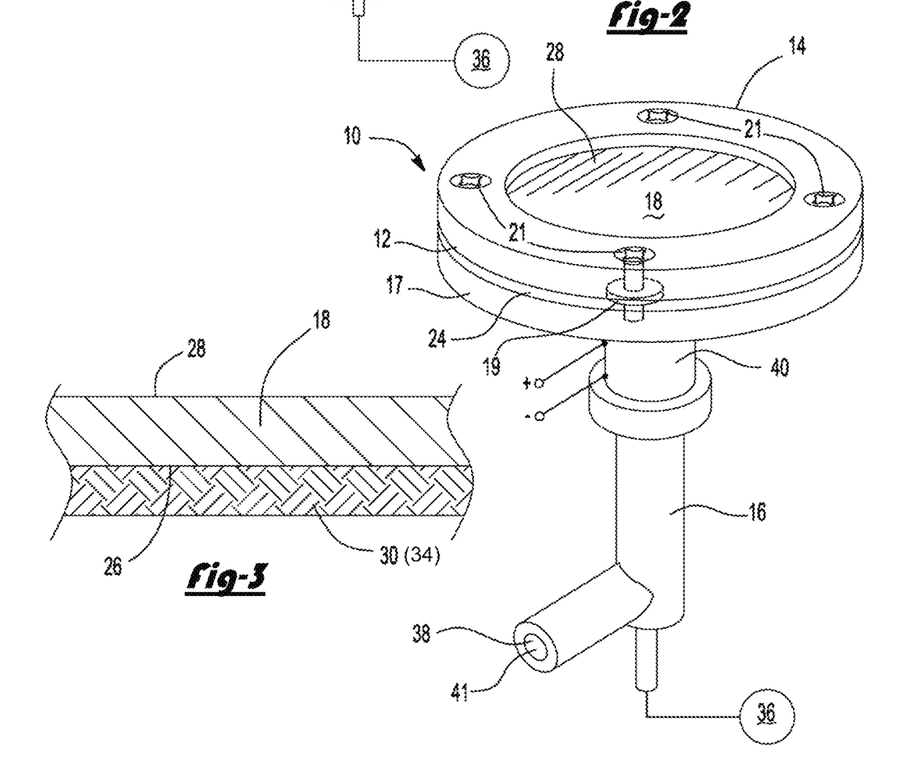
FIG. 2 is a top elevational view of the heater 10.
FIG. 3 is a fragmentary sectional view illustrating the metal sheet with its oxide layer.

FIG. 2 shows the top elevation view of the heater 10. Preferably, however, the housing top 14 includes an upper ring 15 and lower ring 17. The rings 15 and 17 are separated from each other by a plurality of annular spacers 19 (FIG. 1) which form a slot 24 for exhaust gases around the housing top 14. A threaded fastener 21 (FIG. 1) extends through each spacer 19 and secures the rings 15 and 17 together.

A metal sheet 18 is supported in the housing top 14 in any conventional fashion and so that a chamber 20 is formed between the metal sheet 18 and a base 22 of the housing top 14. As further shown in FIG. 3, the metal sheet 18 is preferably constructed of aluminum and includes a first side 26 which forms a top wall of the chamber 20, and a second side 28 which is open exteriorly of the housing 12. The first side 26 of the metal sheet is covered with a thick oxide layer of the same metal forming the sheet 18. Thus, where the sheet 18 is constructed of aluminum, the oxide layer 30 is formed of alumina.

Any conventional means may be used to form the oxide layer 30 on the first side 26 of the metal sheet 18. However, in the preferred form of the invention, the oxide layer 30 is formed by cathodization which produces not only a thick, but also a porous layer 30 of oxide. Other methods, such as anodization, may also be used to form the oxide layer 30.

EXAMPLE

The aluminum 6061 wafers were obtained which have a 100 mm diameter and were cut from a 0.813 mm thick sheet. The wafers were obtained polished on one side with a #8 polish (roughness of 20 to 30 nm) and the other side bare. The polished side was either obtained with a type 2 anodization, or anodized or cathodized according to the variables below.

The wafers were prepped with a multi-step cleaning process (chemical polishing). First, they were sprayed with acetone, then iso-propanol alcohol. Next, they were soaked in 5% NaOH solution for two minutes and then in 25% $HNO_3$ solution for one minute.

For in-house cathodization, the following parameters were kept constant. The electrolyte was 1.0 M oxalic acid ($H_2C_2O_4$). The temperature was not controlled because it has almost no effect on the alumina pore density. Two variables were tested to find the effect on structural features. The times tested were 20, 40, 60, 80, and 100 minutes. The current densities were 1, 2, 3, 4, and 5 A/dm$^2$. Current flowed into a strip of aluminum foil, then the aluminum wafer, next oxalic acid electrolyte, and into the gold wire; this process deposited a layer of porous aluminum oxide onto the aluminum wafer. In embodiments, the cathodization takes place at from about 2 to about 6 A/dm$^2$ and for about 60 to 100 minutes.

For in-house anodization comparison, the wafer was anodized at 0.87 A/dm$^2$ and 80 minutes. The electrochemical circuit was just the opposite of that cathodization.

After anodization or cathodization, the samples were washed with deionized water. Next, the samples were impregnated with a platinum (IV) nitrate solution. The wafers were then put into the furnace at 500° C. to create a platinum (IV) oxide catalyst layer.

The oxide layer 30 is impregnated with a catalyst designed to form a catalytic combustion with hydrocarbon fuel. Any conventional catalyst such as platinum or rhodium may be used to impregnate the metal oxide layer 30.

The flameless catalytic combustion raises the temperature of the second surface to a temperature suitable for cooking food and/or boiling water. This temperature will of course vary depending on the particular food and/or liquid to be cooked, the size and volume thereof, and degree of desired cooking. Typically, food is cooked with a heating temperature between about 175-475° F. (80-246° C.). The United States Department of Agriculture recommends cooking foods to achieve a minimum safe internal temperature to kill harmful germs that cause food poisoning; For beef, pork, veal and lamb: 145° F. (62.8° C.) and allow to rest for at least 3 minutes; ground meats: 160° F. (71.1° C.); ham: 145° F. (62.8° C.) and allow to rest for at least 3 minutes; poultry: 165° F. (73.9° C.); eggs: 160° F. (71.1° C.); fish and shellfish: 145° F. (62.8° C.); leftovers: 165° F. (73.9° C.); and casseroles: 165° F. (73.9° C.). Water boils at 212° F. (100° C.). Other aqueous solutions for human consumption (such as tea or coffee) will boil at a similar temperature.

Using the fabricated heater, a one-third pound beef burger patty starting at 6° C. was used in the preliminary test. It was fitted with a thermocouple in the center, wrapped in aluminum foil, and placed on the center of the aluminum wafer cooking surface. After 10 minutes, the internal temperature reached 120° C. (USDA safe cooking temperature for ground meat is 71.1° C.).

Referring again to FIG. 1, a fuel supply passageway 32 is formed through the housing support leg 16 so that an upper end of the fuel supply passageway 32 is open to the chamber 20. The other end of the fuel passageway 32 is fluidly connected to a pressurized source 36 of hydrocarbon fuel, such as JP-8 jet fuel.

An annular air passageway 38 surrounds the fuel passageway 32 and fluidly communicates with ambient air through an air inlet 41. Air flowing through the air inlet 41 and air passageway 38 intermixes with the vaporized fuel from the fuel source 36 in an alumina porous mixing foam 42 immediately below the chamber 20. This construction ensures full intermixing of the air and the fuel as the air/fuel mixture enters into the chamber 20 and impinges against the metal oxide layer 30.

A heating element 40 is attached to the housing leg 16 so that the heating tape 40 surrounds a portion of both the air passageway 38 and the fuel passageway 32. This heating tape 40 preheats the air and vaporizes the fuel prior to the introduction of the fuel/air mixture into the chamber 20 and against the oxide layer 30 to a temperature sufficient to initiate catalytic combustion. Once catalytic combustion is initiated, the catalytic combustion heats the metal sheet 18 in the desired fashion while the exhaust products from the catalytic combustion exhaust through the exhaust passageways 24 in the housing top 14. However, since the catalytic combustion is much more efficient than conventional hydrocarbon combustion, the emission of noxious gases, such as carbon monoxide, is either greatly reduced or eliminated altogether.

Figure 4:
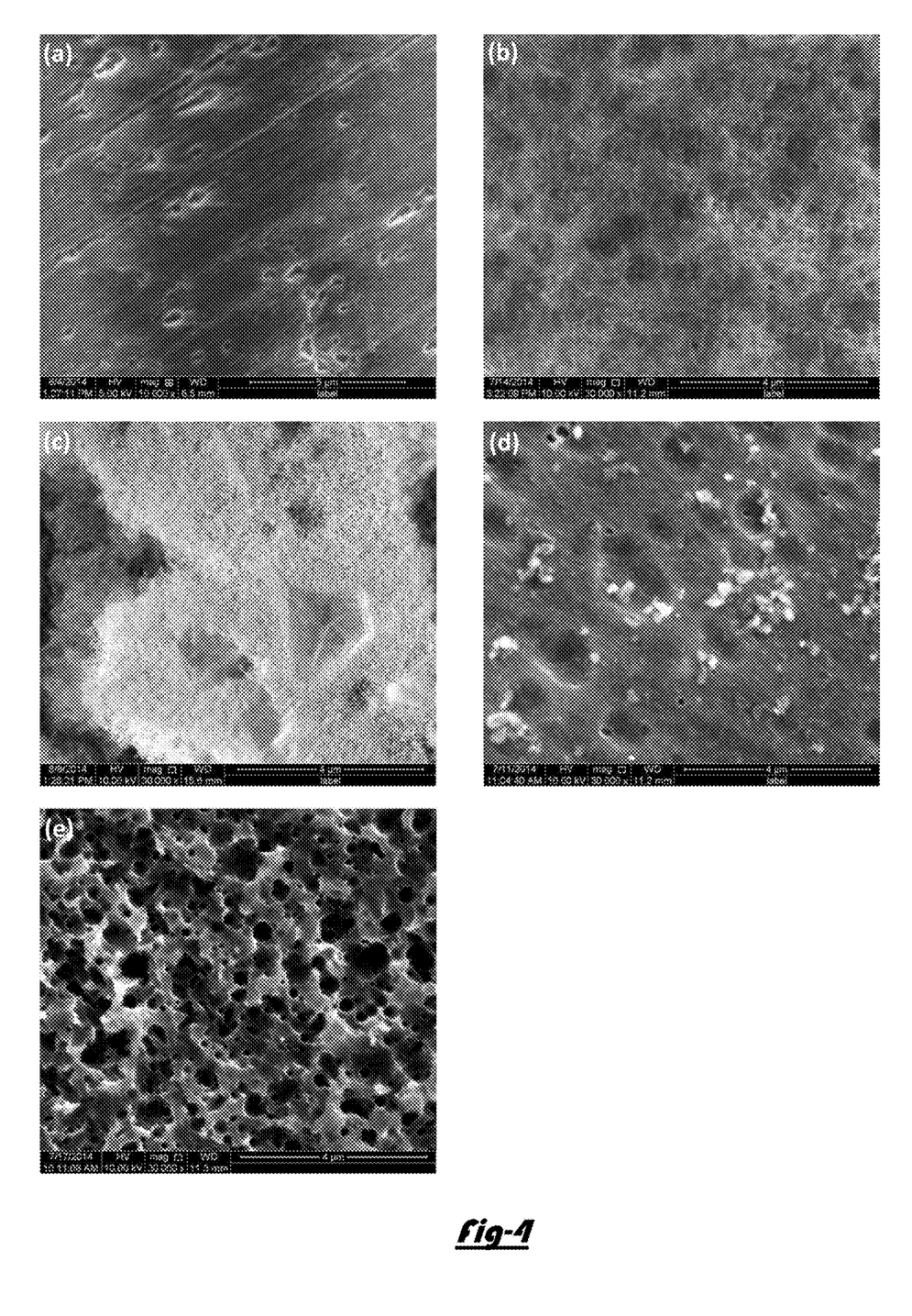
FIG. 4 includes five SEM images of the aluminum wafers with different surface treatments: (a) chemically polished aluminum 6061 wafer; (b) commercially anodized aluminum 6061 wafer; (c) anodized aluminum 6061 wafer, 0.87 A/dm$^2$, 80 min, (d) cathodized aluminum 6061 wafer, 1 A/dm$^2$, 80 min; (e) cathodized aluminum 6061 wafer, 4 A/dm$^2$, 80 min.

FIG. 4 includes five SEM images of the aluminum wafers with different surface treatments. The SEM image of FIG. 4(a) shows a polished aluminum 6061 wafer with a relatively smooth surface. The image of FIG. 4(b) shows commercially anodized aluminum 6061 wafer. Neither of these wafers exhibit a porous surface structure. They serve as a comparison for the anodized and cathodized aluminum 6061 wafers shown in the images of FIGS. 4(c), 4(d) and 4(e) that were produced by anodization at 0.87 A/dm$^2$ for 80 minutes, cathodization at 1 A/dm$^2$ for 80 minutes, and cathodization at 4 A/dm$^2$ for 80 minutes, respectively.

At similar conditions, the wafer anodized at 0.87 A/dm$^2$ for 80 minutes (FIG. 4(c)) was found to produce a porous aluminum oxide more quickly than cathodization at 1 A/dm$^2$ for 80 minutes (FIG. 4(d)). Of the wafer, the one cathodized at 4 A/dm$^2$ for 80 minutes (FIG. 4(e)) shows a porous network structure which is most amenable as a catalyst support.

Figure 5:
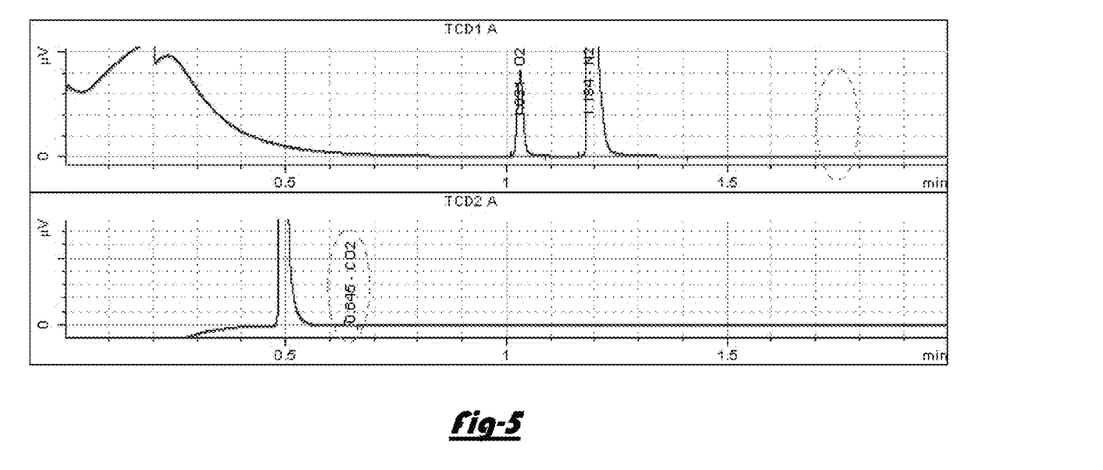
FIG. 5 is a gas chromatogram of preliminary burner test showing present $CO_2$ peak and nonexistent CO peak for test wafers fabricated according to an embodiment of the present invention.

FIG. 5 is a gas chromatogram of preliminary burner test showing present $CO_2$ peak and nonexistent CO peak for test wafers fabricated according to an embodiment of the present invention. The wafers were produced as discussed above. The catalyst-impregnated wafers were then tested in the burner using JP-8. Gas chromatography data showed some carbon dioxide ($CO_2$) formation but no essentially carbon monoxide (CO) formation, thus indicating complete combustion occurring in the burner.

The gas chromatogram illustrates the online gas composition analysis of combustion exhaust gas composition with two parallel separation columns, Moleseive (top) and Plot U (bottom) columns. The dotted zone in the top graph corresponds to carbon monoxide (CO), if present. It was determined that carbon monoxide in the combustion exhaust is below the detection limit of 2.7 ppm of the analysis equipment. The dotted zone in the bottom graph confirms the presence of carbon dioxide ($CO_2$). Quantitative gas analysis of the combustion exhaust gas with carbon balance indicates that the carbon species in converted jet fuel all become carbon dioxide with essentially 100% $CO_2$ product selectivity. (Note: Definition of $CO_2$ product selectivity=$CO_2$ amount/($CO_2$ amount+CO amount)*100%).

That means substantially water and carbon dioxide are the only exhaust products of the flameless catalytic combustion. Additionally, an infrared camera verified that the temperature was relatively evenly distributed. The porous metal wafers having an impregnated catalyst according to embodiments advantageously provide higher combustion efficiency due to better fuel utilization, eliminate unburned hydrocarbon and sooty particles, and reduce CO production leading to safer cooking.

In practice, the heater 10 of the present invention may be used as a cooking stove or cookware article and is particularly useful for applications such as mobile military use. Other applications for the heater 10, however, are clearly within the scope of this invention. For example, the heater of the present invention could be in the form of an article of cookware.

Indeed, cookware having a porous oxide surface impregnated with a flameless catalytic combustion catalyst allows complete burning of fuel resulting in higher energy efficiency and less pollution flue gas.

The fuel side of the metal cookware may be electrochemically produced either by anodization or cathodization, for instance, to form a thin oxide layer on the metal. Then, a catalyst suitable for flameless catalytic combustion is deposited in this oxidized layer. The catalyst may be a noble metal, such as platinum or rhodium, or a metallic oxide thereof, e.g., platinum oxide or rhodium oxide. As a result, the fuel side of the metal cookware becomes a catalytic surface for fuel combustion. When fuel is combusted on this catalytic surface, heat is generated and conductively transferred through the metal cookware into food and/or liquid (such as water) inside the cookware. Such combustion process reduces incomplete flame-based fuel combustion resulting in higher fuel efficiency and safer CO-free combustion.

Figures 6, 7:
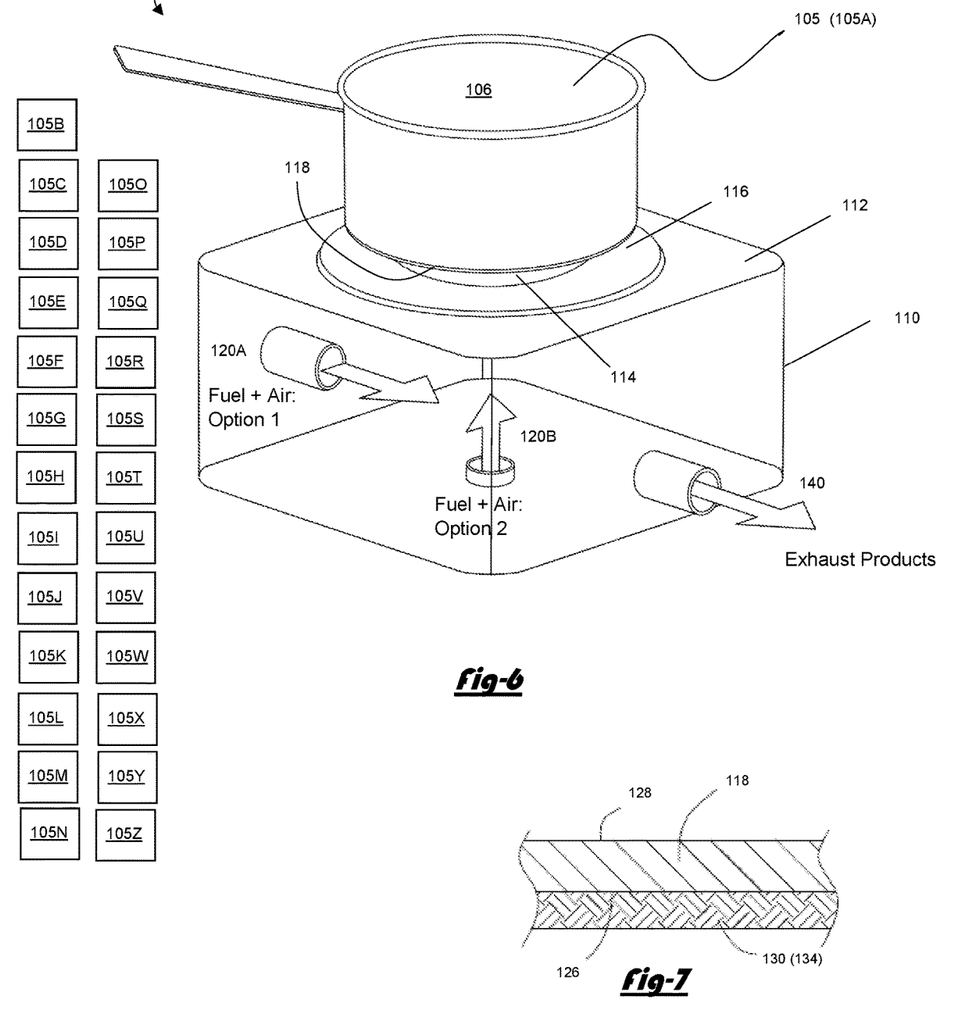
FIG. 6 shows an isometric view of a cookware article heating according to an embodiment.
FIG. 7 is a sectional view illustrating the metal sheet of the cookware article with its oxide layer.

FIG. 6 shows an isometric view of an embodiment 100 of a cookware article 105 heating. An exemplary sauce pan 105A is illustrated in this drawing as the article of cookware 105 but this is just one non-limiting embodiment. Indeed, the cookware 105 may be configured as any article of cookware, such as, for example, a pot 105B, a kettle 105C, a cauldron 105D, a wok 105E, a griddle 105F, a frying pan 105G, a baking pan 105H, a sauté pan 105I, a grill pan 105J, a roasting pan 105K, a sauce pan 105L, a tea/coffee pot 105M, a fondue pot 105N, a skillet 1050, a cookie sheet 105P, a waffle pan 105Q, an omelet pan 105R, a braising pan 1055, a Dutch oven 105T, a tabletop grill 105U, a grill basket 105V, a grill mat 105W, a grill liner 105X, a smoker box 105Y or an outdoor cookware 105Z (symbolically depicted in that drawing). The cookware article 105 is supported by a fuel combustion chamber 110 during flameless catalytic combustion.

FIG. 7 is a sectional view of the cookware article 105 (105A-105Z) further illustrating the metal sheet 118 of the cookware article 105 with its oxide layer in greater detail. It includes a first side 126 which forms an external wall 126 of the cookware article 105, and a second side 128. Moreover, the metal sheet 118 may be initially shaped into the configuration of a particular cookware article, such as by stamping, drawing, casting, etc. as are conventionally known in the cookware arts. In embodiments, the metal sheet 118 may be aluminum, titanium or any alloy thereof as non-limiting examples.

Formation of the porous oxide layer 130 on the metal sheet is performed. The porous metal oxide layer 130 may be formed by anodization or cathodization of the first surface 126 of the metal piece 118, for example. In such cases, the porous metal oxide layer 130 will be an oxide of the same metal forming the metal piece 118. Thus, where the sheet 118 is constructed of aluminum, the oxide layer 130 is formed of alumina (aluminum oxide).

A catalyst 134 is impregnated into the porous oxide layer 130. The catalyst 134 is judiciously selected and configured for effecting flameless catalytic combustion such that the fuel and air interact with the catalyst 134 and undergoes flameless catalytic combustion. The flameless catalytic combustion catalyst 134 may be platinum, rhodium or an oxide thereof as non-limiting examples. Of course, it will be appreciated that other noble metal catalysts, bimetallic catalysts or multi-metallic catalysts may also be used. The flameless catalytic combustion occurs in open air. Holes or other orifices allow air to enter the fuel combustion chamber. Although, pressurized air could be separately flowed into the fuel combustion chamber.

The flameless catalytic combustion generates heat at the first surface 126 of the metal piece 118 which is conductively transferred through the metal piece 118 to the second surface 128 thus raising the temperature of the second surface 126. The rate of the combustion (heating) may be controlled by adjusting the fuel/air ratio, and/or the flow rates of the fuel and/or air. Suitable valves with adjustment knobs may be provided for these purposes.

The porous metal oxide layer 130 is formed on the bottom and/or external sidewalls of the first surface 126 of the metal piece 118. The second surface 128 of the metal piece 118 preferably faces the interior portion 106 of the cookware article 100. Food and/or liquids may be contained in the internal portion 106 of the article 105 where they are to be heated. In some embodiments, the internal portion 106 could also include a stick-resistant coating like Teflon® or a ceramic nitride, for instance.

The fuel combustion chamber 110 supports the cookware article 105 during flameless catalytic combustion heating. It includes a surface 112 which engages the cookware article and also surrounds the porous metal oxide layer 130 which is impregnated with the flameless catalytic combustion catalyst 134. This surface 112 provides a heating location. The combustion chamber 110 further includes a connection to a source of fuel and an opening 114 for providing a flow of fuel and air to the surrounded porous metal oxide layer 130.

Figure 8A:
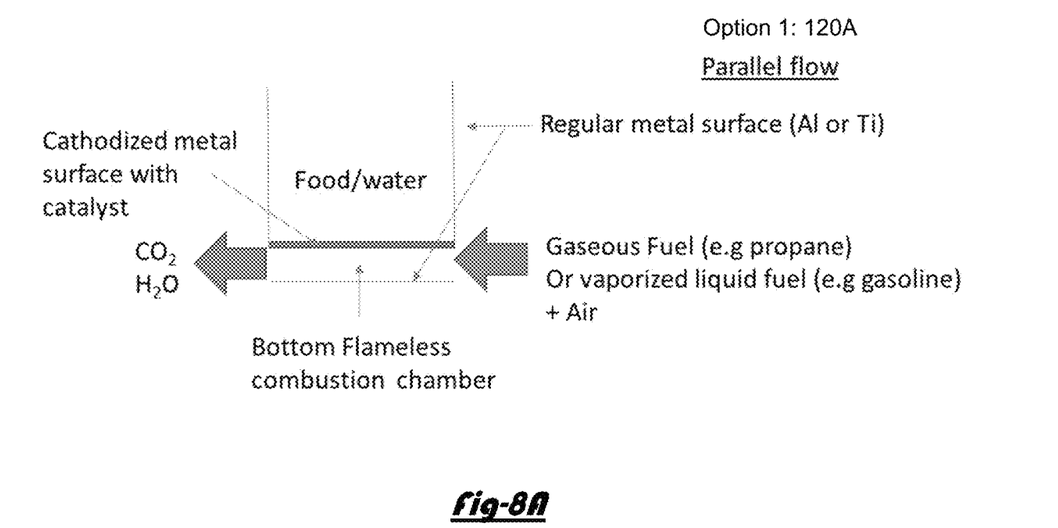
FIG. 8A is a schematic illustrating an embodiment of the fuel combustion chamber in which the flow of fuel is parallel to the bottom catalytic surface of the cookware.
Figure 8B:
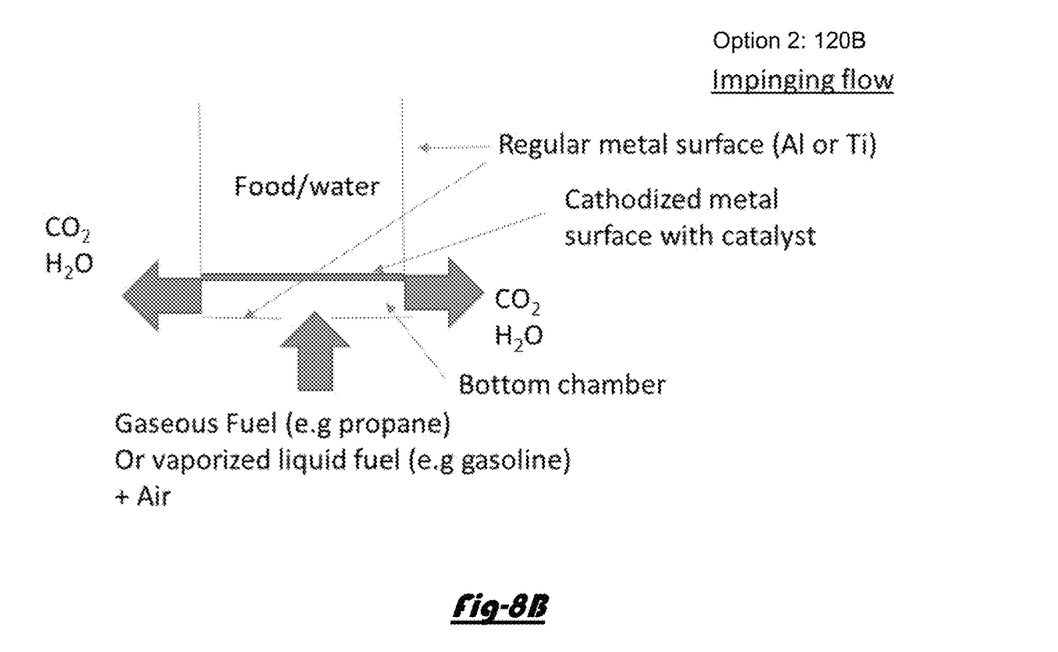
FIG. 8B is a schematic illustrating an embodiment of the fuel combustion chamber in which the flow of fuel impinges on the bottom catalytic surface of the cookware.

The flow of fuel and air may be (i) substantially parallel to the surrounded porous metal oxide layer entering a side opening 120A (as shown in FIG. 8A), or (ii) substantially perpendicular to the surrounded porous metal oxide layer entering a bottom opening 120B (as shown in FIG. 8B). The exhaust products of the flameless catalytic combustion exit opening 140, which is illustrated on the side of the housing, for instance; but this location is non-limiting. One or both options are possible.

The surface 112 forms a heating location for the cookware 105. It comprises one or more openings 114, with each opening 114 having a lip 116 to support at least an outer periphery of the bottom of the cookware article 105. The lip 116 may be recessed with respect to the surface to better support and hold the cookware. The recessed lop 116 may also help effect a seal around the outer periphery of porous oxide layer 130.

The opening 114 in the fuel combustion chamber 110 may also comprises a porous foam where air intermixes with the fuel. The foam would be similar to foam 42 illustrated in FIG. 1 and may be a metallic foam. Such open foam provides the environment for the fuel and oxygen to mix well. Other variations could also microchannel "reactor" in this bottom chamber.

In some embodiments, the fuel combustion chamber 110 may further include a heating element which preheats the air and vaporizes the fuel entering the opening 114. While not shown, such an embodiment would be similar to the heating element 40 shown in FIG. 1. For instance, the heating element might be provided on a cylindrical portion that extends down from the recessed lip 115 and which fuel and air flow upward through to the bottom surface of the cookware. Thus, the fuel and air can be pre-heated before the catalytic combustion.

FIG. 8A is a schematic illustrating an embodiment of the fuel combustion chamber in which the flow of fuel is parallel to the bottom catalytic surface of the cookware corresponding to opening option 120A. Combustion occurs in the combustion chamber with fuel entering from the side parallel to the bottom of the cookware.

FIG. 8B is a schematic illustrating an embodiment of the fuel combustion chamber in which the flow of fuel impinges on the bottom catalytic surface of the cookware corresponding to opening option 120B. Combustion occurs in the combustion chamber with fuel impinging to the bottom of the cookware.

Figure 9:
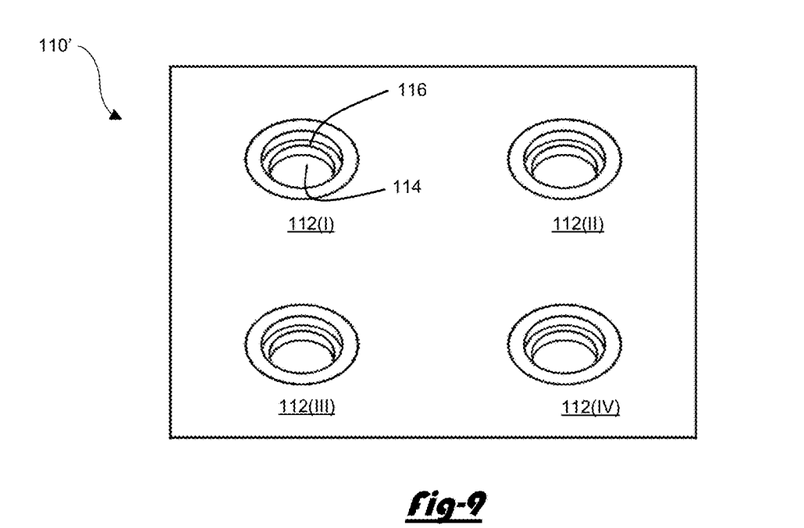
FIG. 9 is a top view of the fuel combustion chamber having four heating locations according to an embodiment.

The embodiment illustrated in FIG. 6 shows the fuel combustion chamber having a single location for heating cookware. This structure may be small and compact making it ideal for camping and/or field use in which size and/or weight are to be at a minimum. Additional heating locations may be provided in other embodiments. Indeed, FIG. 9 is a top view of an embodiment of the fuel combustion chamber 110' having four heating locations 112(I)-112(IV) for cookware heating according to an embodiment. This type of structure may be better suited for permanent or fixed use, such as in a kitchen setting. Each of these four heating locations is equally sized, including their bottom openings 114 and lips 116 (identified in this figure at only heating location 112(I)).

Figure 10:
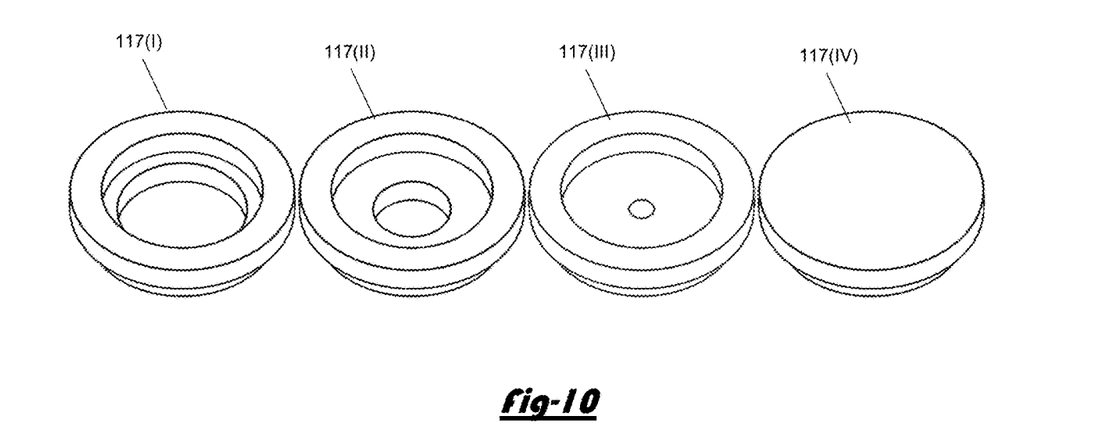
FIG. 10 shows a set of plates for the fuel combustion chamber heating location(s) to accommodate sized cookware articles according to an embodiment.

To accommodate cookware articles of varied sizes, one or more of the locations may be differently sized. For instance, FIG. 10 shows a set of plates 117(I)-117(IV) for the fuel combustion chamber heating location(s) to accommodate sized cookware articles according to an embodiment. As shown, the bottom openings in the plates 117(I)-1117(III) are of differing diameters whereas bottom opening(s) 114 of the fuel combustion chamber 110 is not. These three plates 117(I)-117(II) have a stepped bottom surface to be supported on the lip 116 and further have their own recessed bottom surface to support cookware. The outer diameters and/or the depths of their recessed bottom surfaces might also vary to better and more snugly engage cookware articles. Plate 117(IV) has no bottom opening and thus can be used for unused heating location to prevent fuel from escaping from the fuel combustion chamber 100.

Figure 11:
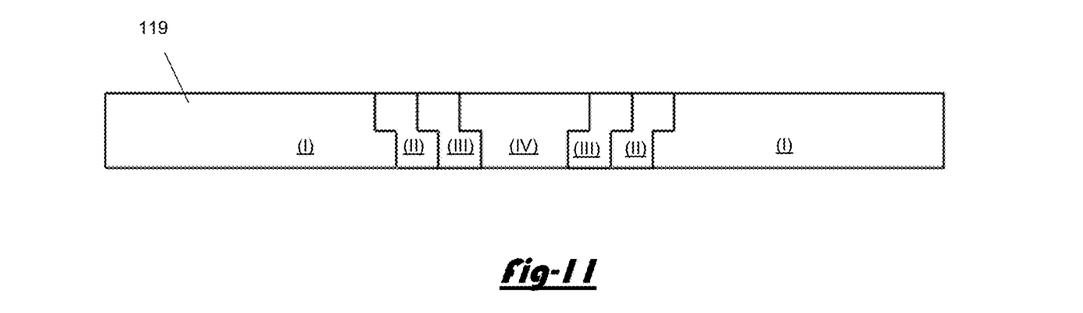
FIG. 11 is a cross-sectional view of a set of nesting plates for the fuel combustion chamber heating location(s) to accommodate sized cookware articles according to an embodiment.

In other embodiments, a set of nesting plates 119(I)-(IV) for the fuel combustion chamber heating location(s) to accommodate different sized cookware articles. FIG. 11 is a cross-sectional view of the set of nesting plates 119(I)-119(IV) with varying diameters. One or more of innermost plate(s) can be removed to accommodate a given cookware article, and especially, its catalyst impregnated porous oxide layer. Three plates 119(I)-119(III) are shown have different sized openings in their bottoms, providing a recessed surface to engage the cookware and provide an opening for fuel. The center plate 119(IV) include no bottom opening and can be used for an unused heating location.

Alternatively or additionally, adjustable baffles or gas valves (not shown) could also be provided to block and/or cordon off fuel flow to an unused heating location in various embodiments.

From the foregoing, it can be seen that the present invention provides a heater, which is particularly useful as a mobile military stove, which is not only efficient in operation, but eliminates the noxious gases from the previously known mobile military stoves. Having described my invention, however, many modifications thereto will become apparent to those skilled in the art to which it pertains without deviation from the spirit of the invention as defined by the scope of the appended claims.

I claim:

1. A fuel combustion chamber for supporting a cookware article comprising:
   a metal piece having a first and second surfaces;
   a porous metal oxide layer formed directly on said first surface of said metal piece; and
   a combustion catalyst impregnated within said porous metal oxide layer, the catalyst effecting flameless catalytic combustion,
   wherein fuel interacts with the catalyst in the porous metal oxide layer and undergoes flameless catalytic combustion which generates heat, and heat generated by the flameless catalytic combustion at the first surface of the piece is conductively transferred through the metal piece to the second surface raising the temperature of the second surface,
   said fuel combustion chamber comprising:
      a surface which engages said cookware article and surrounds the porous metal oxide layer impregnated with the flameless catalytic combustion catalyst;
      a connection to a source of fuel; and
      an opening for providing a flow of fuel and air to the surrounded porous metal oxide layer,
      wherein the surface comprises one or more openings, with each opening comprising a lip to support at least an outer periphery of the bottom of the cookware article, and
      the lip forms a releasable seal around the outer periphery of porous oxide layer of the cookware article.

2. The fuel combustion chamber as defined in claim 1, wherein the porous metal oxide layer is formed on the bottom and/or external sidewalls of said first surface of said metal piece.

3. The fuel combustion chamber as defined in claim 1, wherein said second surface of said metal piece faces the interior of the cookware article.

4. The fuel combustion chamber as defined in claim 1, wherein the cookware article comprises: a pot, a kettle, a cauldron, a wok, a griddle, a frying pan, a baking pan, a sauté pan, a grill pan, a roasting pan, a sauce pan, a tea/coffee pot, a fondue pot, a skillet, a cookie sheet, a waffle pan, an omelet pan, a braising pan, a Dutch oven, a tabletop grill, a grill basket, a grill mat, a grill liner, a smoker box or an outdoor cookware.

5. The fuel combustion chamber as defined in claim 1, wherein said metal piece comprises a piece of titanium metal or aluminum metal.

6. The fuel combustion chamber as defined in claim 1, wherein said porous metal oxide layer comprises an oxide of the same metal forming the metal piece.

7. The fuel combustion chamber as defined in claim 1, wherein said porous metal oxide layer is formed by anodization or cathodization of the first surface of said metal piece.

8. The fuel combustion chamber as defined in claim 1, wherein said catalyst comprises platinum or rhodium or an oxide thereof.

9. The fuel combustion chamber as defined in claim 1, wherein said flameless catalytic combustion raises the temperature of the second surface to a temperature suitable for cooking food and/or boiling water.

10. The fuel combustion chamber as defined in claim 1, wherein the catalytic combustion reduces and/or eliminates carbon monoxide emissions during cooking.

11. The fuel combustion chamber as defined in claim 1, wherein the flow of fuel is (i) substantially parallel to the surrounded porous metal oxide layer, or (ii) substantially perpendicular to the surrounded porous metal oxide layer.

12. The fuel combustion chamber as defined in claim 1, wherein the opening further comprises a porous foam where air intermixes with the fuel.

13. The fuel combustion chamber as defined in claim 1, wherein the lip is recessed with respect to the surface.

14. The fuel combustion chamber as defined in claim 1, further comprising a mixing foam provided in the opening enabling the fuel and air to mix.

15. The fuel combustion chamber as defined in claim 1, further comprising a heating element which preheats the air and vaporizes said fuel entering the opening.

16. The fuel combustion chamber as defined in claim 1, wherein said fuel connection connects to a source of JP-8 jet fuel, gasoline, kerosene, liquefied petroleum gas, or propane.

17. The fuel combustion chamber as defined in claim 1, wherein the cookware article is removable from the surface.

* * * * *